United States Patent [19]

Wells

[11] Patent Number: 5,782,201
[45] Date of Patent: Jul. 21, 1998

[54] AUTOMATED LIVESTOCK FEEDING SYSTEM

[76] Inventor: John A. Wells, 7280 Hoyie Rd., North Adams, Mich. 49262

[21] Appl. No.: 886,218

[22] Filed: Jul. 1, 1997

[51] Int. Cl.$^6$ ............................................... A01K 5/02
[52] U.S. Cl. ............................ 119/57.4; 119/56.1
[58] Field of Search ..................... 119/51.11, 51.13, 119/56.1, 56.2, 57.4

[56] References Cited

U.S. PATENT DOCUMENTS

| | | | |
|---|---|---|---|
| 3,077,975 | 2/1963 | Hobbs . | |
| 3,105,463 | 10/1963 | Pilch . | |
| 3,144,173 | 8/1964 | France et al. . | |
| 3,155,286 | 11/1964 | Van Peursem . | |
| 3,180,318 | 4/1965 | Fisher . | |
| 3,295,500 | 1/1967 | Blough | 119/51.5 |
| 3,415,228 | 12/1968 | Myers | 119/51.11 |
| 3,543,728 | 12/1970 | Buschbom . | |
| 3,585,970 | 6/1971 | Scott et al. | 119/53 |
| 3,786,783 | 1/1974 | Ripstein . | |
| 3,901,194 | 8/1975 | Meyer et al. | 119/53 |
| 3,904,082 | 9/1975 | Hostetler | 222/70 |
| 4,029,052 | 6/1977 | Launder . | |
| 4,185,587 | 1/1980 | Kallin | 119/51.11 |
| 4,712,511 | 12/1987 | Zamzow et al. . | |
| 4,981,107 | 1/1991 | Beaudoin et al. | 119/56.2 |

Primary Examiner—Robert P. Swiatek
Assistant Examiner—James S. Bergin
Attorney, Agent, or Firm—Harness, Dickey & Pierce, P.L.C.

[57] ABSTRACT

An automated livestock feed delivery system for delivering a pre-weighed quantity of feed to one of a plurality of feeders along a single feed delivery conduit. The system can include multiple feed storage bins for delivery of different feeds to different feeders along the delivery conduit. When feed is required, as sensed by a feed level sensor, feed is delivered from one of the storage bins into a weighing hopper where the quantity of feed is weighed. The feed is then moved through the delivery conduit by an auger or a cable and disk mechanism to deliver the feed to one of a plurality of drop boxes along the conduit. A valve in the particular drop box is opened, enabling the feed to drop from the conduit into the drop box and from there into the feeder. A programmable controller controls the operation of the system and records the weight of feed delivered to each feeder. The system is particularly useful in feed research where it is necessary to accurately record the quantity of feed consumed to compare with the weight gain of the livestock fed with different feeds.

15 Claims, 2 Drawing Sheets

1

AUTOMATED LIVESTOCK FEEDING SYSTEM

BACKGROUND AND SUMMARY OF THE INVENTION

The present invention relates to an automated livestock feeding system and in particular to a feeding system which delivers a pre-determined quantity of feed to one of a plurality of livestock feeders through a single feed conduit such as an auger. In addition, the feed can be selected from one of several feed bins so that certain feeders along the feed conduit are supplied with one feed while other feeders along the same conduit can be supplied with a different feed.

Automated livestock feeder systems are well known and are available in a variety of forms. For example, one type of common feeding system that uses a single conduit to deliver feed to multiple feeders will deliver feed to the first feeder along the conduit until that feeder is full. The conduit then delivers feed to the second feeder until that feeder is full, etc. This type of system works fine for filling the feeders. However, there is no way of determining the quantity of feed that is delivered to each feeder. All feeders are filled to a maximum capacity regardless of how much feed remained in each feeder at the time they were filled. In addition, all feeders are supplied with the same feed.

In another type of feeding system, where it was desired to control the amount of feed delivered to a given feeder, when the feed was needed, the entire auger or delivery conduit is first filled with feed. A drop box is then opened at the specified feeder. The auger or conduit is operated for a pre-set length of time to deliver the feed. The quantity of feed is calculated from the volume capacity of the auger and length of time it is operated. The feed measurement is not very accurate. The density of a given feed will vary. With such a system, while it is possible to provide different types of feed to selected feeders, each time a different feed is requested, it is necessary to completely empty the auger and completely fill it with a second type of feed before delivering the second feed. This requires an excessive amount of time to fill a given feeder.

In yet another type of system, the feed delivered to a feeder is previously weighed for the purpose of regulating the quantity of feed supplied to an individual feeder. The livestock is provided a fixed amount of feed per day. The amount of feed is varied over the growth cycle of the livestock. The weight of the feed is used as a means to regulate the amount of feed delivered.

None of the systems mentioned above provide a measured quantity of feed, based on weight, selected from one or more feed types and delivers the measured quantity to a particular feeder along a serial delivery conduit based upon demand to ensure that feed is always available within the feeders. The demand can be determined with feed level sensors within each feeder which provide a low feed level signal to the controller when the feed level drops below a given height. Alternatively, feed can be delivered based on a time schedule with the time interval and/or feed quantity calculated to ensure feed availability at all times to allow the livestock to feed at will.

Such a feeding system is particularly useful in research where various types of feeds are being evaluated and it is necessary to know the quantity of feed consumed by different animals to compare one feed to another. Weight gain as a function of the quantity of feed consumed using a single feed type is also useful in testing of different breeds of livestock and in genetic research. The livestock feeding system of the present invention overcomes the deficiencies in the prior art feeding systems to provide a system in which a pre-weighed quantity of feed is delivered to a specified feeder for the purpose of accurately measuring the quantity of feed consumed by the livestock that feed from the given feeder.

The system of the present invention includes one or more storage bins containing different types of feed. When feed is required for a particular feeder, as sensed by a level sensor within the feeder, feed from the pre-programmed storage bin is delivered to a weighing hopper. The weighing hopper is coupled to a load cell. The feed in the weighing hopper is weighed and the weight is recorded. The feed is then delivered through a conduit, such as an auger, to a drop box associated with the empty feeder. The drop box includes a valve that is opened to enable the feed to drop from the conduit into the drop box. A tube directs the feed from the drop box into the feeder. All of the other drop boxes positioned along the conduit have their respective valves closed, thereby preventing the feed from dropping into the wrong feeder.

Unlike many other feeding systems, the drop box is designed with a valve that closely fits the conduit housing. This minimizes or eliminates the loss of feed as the pre-weighed quantity of feed is delivered along the conduit to the specified feeder. As a result, high accuracy in delivering the measured quantity of feed is achieved while realizing the cost efficiency of utilizing a single serial conduit to supply feed to a plurality of feeders. The valves or gates at each drop box are controlled electrically, pneumatically or hydraulically, etc. to open and close each gate independent of the other gates.

While manual weighing and delivery of feed to hoppers can be performed for the purpose of recording the quantity of feed consumed, due to the large labor required for manual feeding and the rising labor cost, a manual weighing system is not practical.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
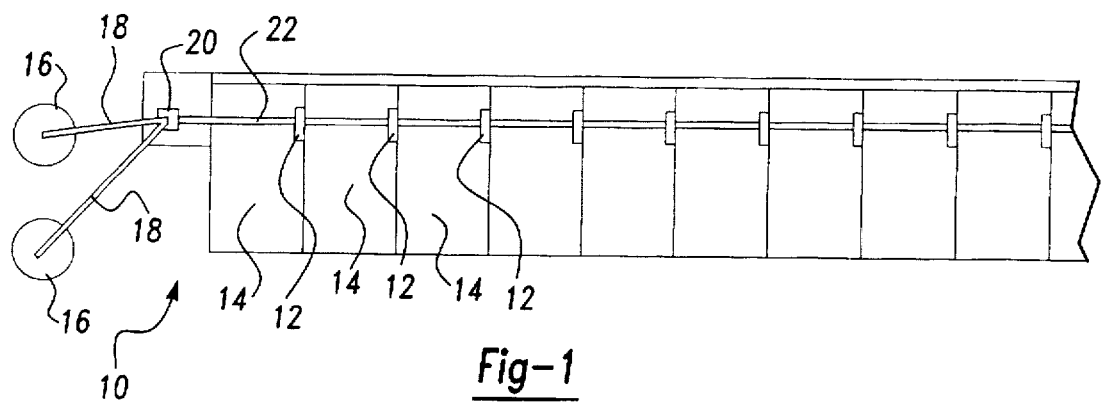
FIG. 1 is a schematic plan view of an automated feeding system of the present invention.

An overview of the automated feeding system of the present invention is shown schematically in FIG. 1. The feeding system 10 is used to provide feed to a plurality of feeders 12. Each feeder serves a pen 14 containing livestock, such as swine, etc.

Feed is stored in one or more feed storage bins 16. Multiple feed storage bins are provided to enable use of two or more different feeds. Different feeds can be delivered to selected pens to conduct comparative research with different feeds. Alternatively, different feeds can be used during different times of an animal's life cycle. When a feeder 12 is empty, or programmed for filling, feed is delivered from one of the feed storage bins through an associated auger 18 to a weighing hopper 20. The feed in the hopper is weighed and the weight of the feed is recorded for data acquisition. The feed is then delivered from the weighing hopper 20 through a feed delivery conduit 22, such as an auger or a cable and disk delivery system. The feeders 12 are arranged serially along the conduit 22. The conduit 22 delivers the feed to a drop box 24 associated with the particular feeder 12 to be filled. Each drop box includes a valve that opens the conduit and allows the feed to be discharged from the conduit into the drop box. The valves are each individually controlled, pneumatically, electrically, hydraulically, etc such that only one valve is open at any given time for delivery of feed to a single feeder.

Figure 2:
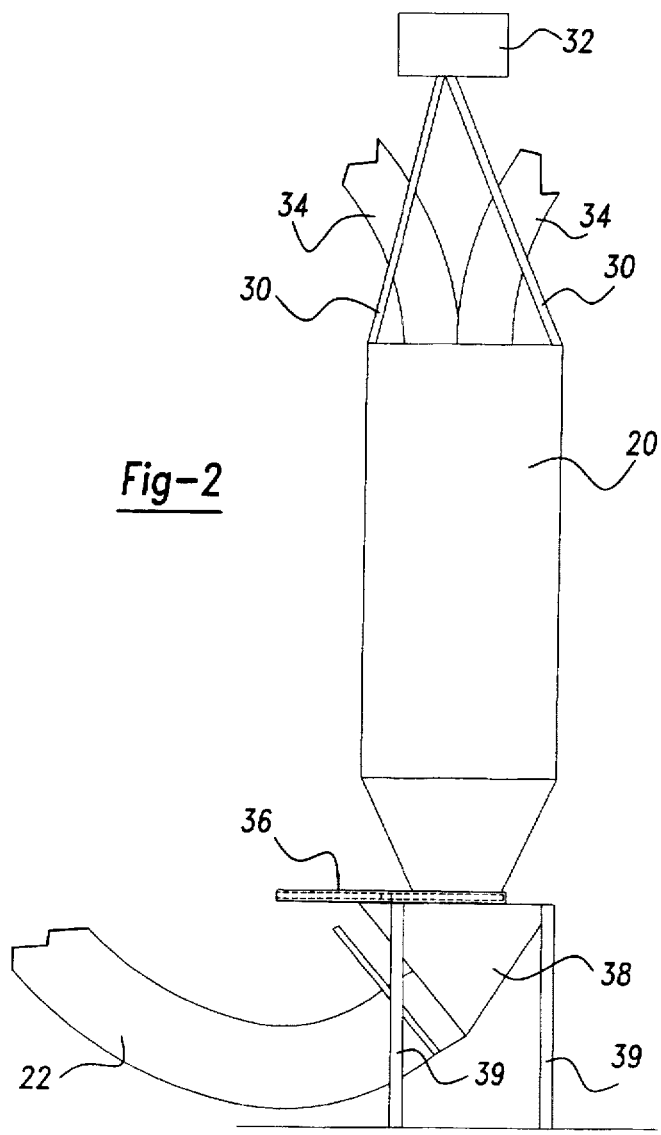
FIG. 2 is an elevational view of the weighing hopper of the feeding system of the present invention.

The weighing hopper 20 is shown in greater detail in FIG. 2. The hopper 20 is supported by chains 30 which are in turn suspended from a load cell 32. The load cell is used to weigh the feed within the hopper. Feed is delivered into the hopper by the drop tubes 34 coupled to the augers 18 that supply feed from the feed storage bins.

Figure 3:
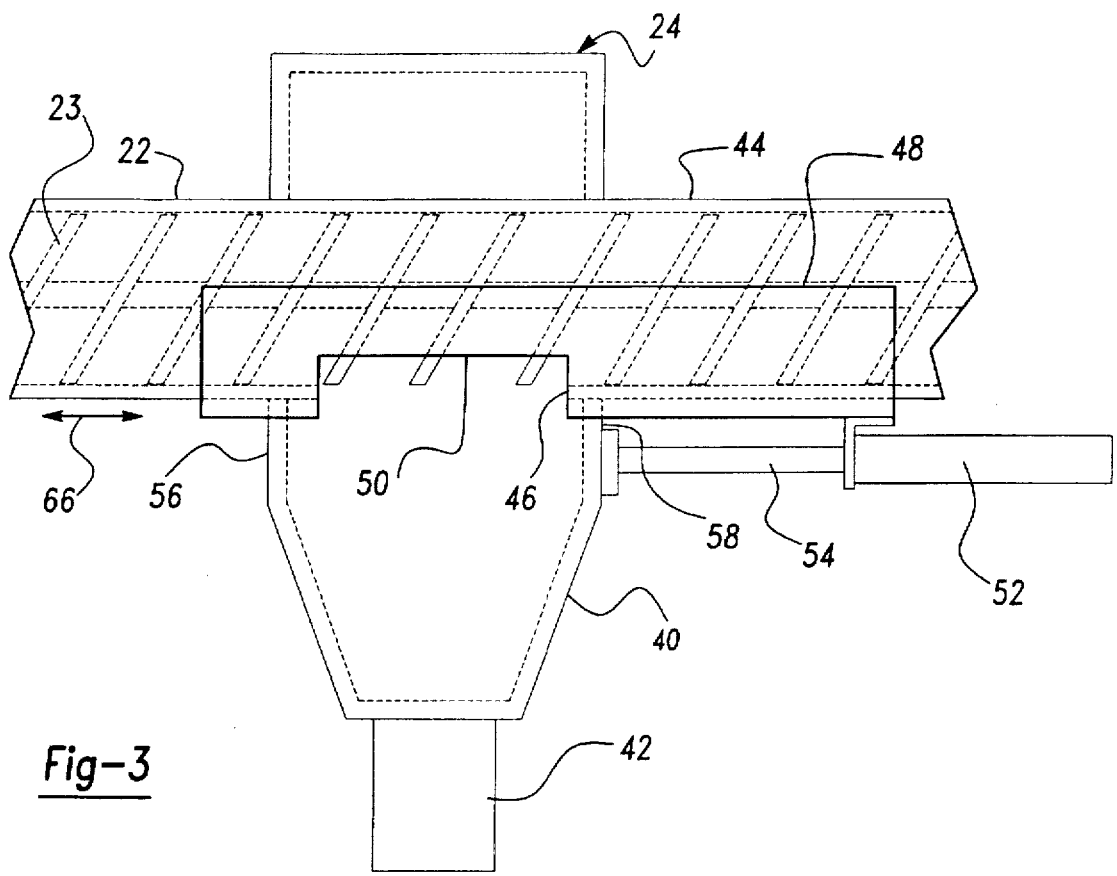
FIG. 3 is a sectional view of the delivery conduit and a drop box along the conduit.

Once the feed is weighed, the lower outlet of the hopper 20 is opened by a slide gate 36. When open, the feed drops from the hopper 20 into the inlet opening 38 of the feed delivery conduit 22, with a flex auger 23 therein (FIG. 3). Inlet 38 is supported upon legs 39 while the hopper 20 is supported by the chains 30 and is able to swing relative to the inlet 38. Alternatively, the weighing hopper 20 could be supported upon a load cell rather than being suspended from a load cell.

A drop box 24 is shown in greater detail in FIG. 3. The box 24 forms a housing surrounding a portion of the feed delivery conduit 22. The lower end 40 of the drop box is tapered, leading the feed to a drop tube 42 which extends downward into the associate feeder 12 therebelow. The tube or housing 44 of the feed delivery conduit has an opening 46 within the drop box. A slide gate 48 is mounted in the drop box and slides longitudinally relative to the conduit 22 in the direction of arrow 66. The slide gate 48 also includes an opening 50. When the opening 50 in the slide gate is aligned with the opening 46 in the tube 44, feed is allowed to drop from the conduit 22 into the drop box and into the feeder therebelow.

The slide gate 48 is coupled to an actuator 52 such as a pneumatic cylinder having an extendable rod 54. As shown, the rod 54 is anchored at one end to the drop box 24 while the cylinder itself is coupled to the slide gate 48. Upon actuation to extend the rod 54, the cylinder will move away from the drop box, moving the slide gate from a closed position in which the conduit opening 46 is covered to an opened position in which the slide gate and conduit openings are aligned. The actuator 52 is preferably a pneumatically controlled air cylinder. Electric solenoids, hydraulic cylinders and electric motors can be used to move the slide gate 48 if desired. A pneumatic cylinder provides a low cost device for moving the slide gate and does not present potential hazards from an oil leak that accompanies a hydraulic system. An electric motor with a rotating output shaft can be used with a slide gate that slides circumferentially about the conduit instead of longitudinally.

In both the open and closed positions of the slide gate, the slide gate extends through the opposite side walls 56 and 58 of the drop box. The drop box side walls thus provide bearing support for the slide gate 48. To minimize the loss of feed as a weighed quantity of feed is being delivered through the conduit 22 past numerous drop boxes 24, the slide gate 48 is closely fitted to the exterior of the conduit tube 44 Feed is lost by collecting in the opening 46 in the conduit tube 44 in each drop box. By minimizing the size of the opening 46 and closely fitting the slide gate 48 over the conduit tube 44, it is possible to reduce the loss to an acceptable amount. While this loss is minimized, it can also be compensated for by programming the controller to subtract the amount of loss from a measured quantity of feed by calculating the number of drop boxes in which some feed will be collected while a given quantity of feed is being delivered.

Figure 4:
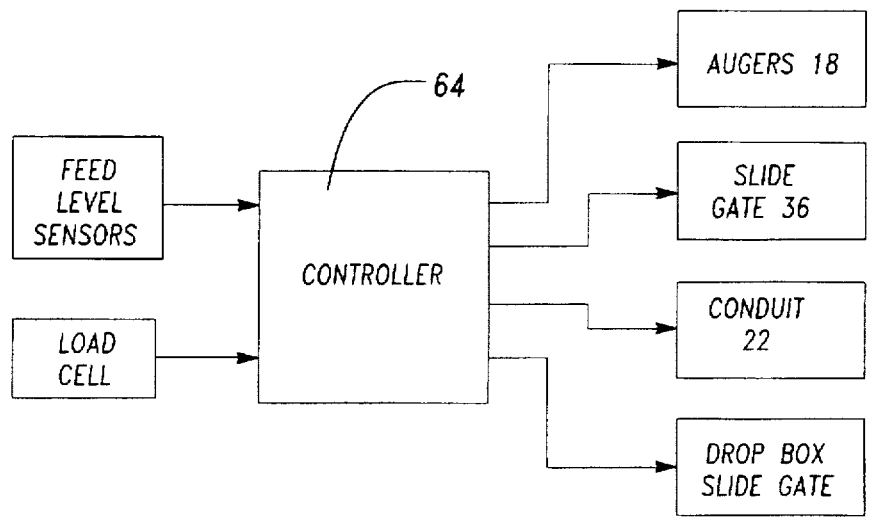
FIG. 4 is a schematic diagram of the system controller showing the inputs and outputs.

Operation of the livestock feeding system is controlled by a programmable controller 64 shown in FIG. 4. Controller 64 is pre-programmed to deliver a particular feed to each of the associated feeders. When a feed level sensor located in each of the feeders indicates that the level of feed has dropped below a pre-determined quantity, a low feed level signal is sent to the controller. The controller 64 then activates one of the augers 18 to deliver the pre-selected feed from the appropriate feed storage bin to the weighing hopper 20. Once a preset amount of feed is moved into the weighing hopper, the auger 18 is turned off. The system pauses momentarily to allow the load cell to stabilize. The amount of feed in the weighing hopper is weighed and the value recorded in the memory of the controller. The slide gate for the appropriate drop box is then opened and the auger or the cable and disk mechanism in the conduit 22 is operated to move the feed from the weighing hopper to the drop box. The feed drops from the conduit to the feeder therebelow. Afterwards, the drop box slide gate is closed to close the conduit opening and thereby enable feed to be delivered to another feeder as necessary.

The automated livestock feeding system of the present invention enables a predetermined quantity of feed (by weight) to be delivered along a single conduit to one of a plurality of feeders. This enables recording of the amount of feed consumed by the livestock in each pen. This is accomplished by using a single delivery conduit, thus minimizing the expense of the delivery machinery and reducing the overall cost of the feeding system. Each drop box gate is independently controlled by the controller 64. This enables individual delivery of feed to a specified feeder without delivery of feed to the other feeders along the delivery conduit.

It is to be understood that the invention is not limited to the exact construction illustrated and described above, but that various changes and modifications may be made without departing from the spirit and scope of the invention as defined in the following claims.

I claim:

1. An automated livestock feed delivery system for individually delivering a pre-weighed quantity of feed to one of plural feeders to ensure that feed is always available in the feeder, the system comprising:

a weighing hopper for holding a quantity of feed;

weighing means for weighing feed within the weighing hopper;

one or more feed storage bins for one or more storing feed;

first feed moving means for delivering feed from one of the storage bins to the weighing hopper;

a feed delivery conduit containing second feed moving means for moving feed from the weighing hopper to one of the plural feeders;

a plurality of feed drop boxes located serially along the conduit, each drop box positioned above and associated with one of the plural feeders, the conduit having an opening therein at each drop box to enable feed to drop from the conduit into each drop box;

a movable valve member covering each opening in the conduit in a closed position to prevent feed from dropping into the drop box;

valve member moving means for moving each valve member to an open position in which the opening in the conduit is uncovered whereby feed is able to drop from the conduit into the drop box, the valve member moving means operable to move each valve member independently of the other valve members;

a drop tube for directing feed from each drop box to the associated feeder therebelow; and a programmable controller for controlling the operation of the weighing means, the first feed moving means, the second feed moving means, and the valve member moving means and for recording the weight of feed delivered to each of the plural feeders.

2. The feed delivery system of claim 1 further comprising a feed level sensor in each of the plural feeders to provide a low feed signal to the controller when the level of feed in the associated feeder drops below a given level.

3. The feed delivery system of claim 1 wherein the weighing means includes a load cell coupled to the weighing hopper to weigh the quantity of feed therein.

4. The feed delivery system of claim 3 wherein the weighing hopper is suspended from the load cell.

5. The feed delivery system of claim 1 wherein the movable valve member is closely fitted to the feed delivery conduit.

6. The feed delivery system of claim 5 wherein the feed delivery conduit is cylindrical in shape and the movable valve member is a slide gate having a semi-cylindrical shape to fit over a lower half of the conduit.

7. The feed delivery system of claim 1 wherein the valve member moving means includes a pneumatic actuator.

8. The feed delivery system of claim 1 wherein the valve member moving means includes an electric actuator.

9. A method of delivering feed to feeders within a plurality of livestock pens to ensure that feed is always available in the feeder and of monitoring the quantity of feed delivered to each feeder, the method comprising the steps of:

moving a quantity of feed from a feed storage bin to a feed weighing hopper through a first feed delivery means;

weighing the feed within the feed weighing hopper with a weighing means operatively associated with the weighing hopper for weighing feed therein;

recording the weight of the feed in the weighing hopper in a memory of a programmable controller;

moving the weighed feed from the weighing hopper through a feed delivery conduit by a second feed moving means, the conduit having a plurality of feed drop boxes located serially along the conduit and the conduit having an opening therein within each drop box and a valve member movable between closed and opened positions in which the conduit opening is covered and uncovered respectively;

moving the valve member of one drop box to its opened position while the valve members of the other drop boxes remaining in their closed positions whereby the weighed feed is allowed to drop from the conduit into the drop box after which the feed falls through a drop tube to a feeder therebelow in one of the livestock pens; and programming the programmable controller to deliver feed to each of the feeders by the above steps according to a predetermined schedule.

10. The method of claim 9 wherein the predetermined schedule includes delivery of feed when the level of feed within a feeder drops below a pre-set level as detected by a feed lever sensor within each feeder, the feed level sensor producing a low feed level signal when the feed therein drops below the pre-set level, the low feed level signal being received by the programmable controller.

11. The method of claim 9 wherein the predetermined schedule is based on time with a predetermined weight of feed being delivered to the feeders at predetermined time intervals.

12. The method of claim 9 further comprising the step of:
selecting feed from one of plural feed storage bins each containing a different feed in response to a pre-programmed feed selection for each of the feeders.

13. A method of comparing the performance of two different livestock feeds comprising the steps of:

moving a quantity of a first feed from a first feed storage bin to a feed weighing hopper through a first feed delivery means;

weighing the first feed within the feed weighing hopper with a weighing means operatively associated with the weighing hopper for weighing feed therein;

recording the weight of the first feed in the weighing hopper in a memory of a programmable controller;

moving the weighed first feed from the weighing hopper through a feed delivery conduit by a second feed moving means, the conduit having a plurality of feed drop boxes located serially along the conduit and the conduit having an opening therein within each drop box and each drop box having a valve member movable between closed and opened positions in which the conduit opening is covered and uncovered respectively;

moving the valve member of one drop box of a first group portion of the drop boxes to its opened position while the valve members of the other drop boxes remain in their closed positions whereby the weighed first feed is allowed to drop from the conduit into the drop box after which the first feed falls through a drop tube to a feeder therebelow within a livestock pen;

moving a quantity of a second feed from a second feed storage bin to the feed weighing hopper through the first feed delivery means;

weighing the second feed within the feed weighing hopper with the weighing means operatively associated with the weighing hopper for weighing feed therein;

recording the weight of the second feed in the weighing hopper in the memory of the programmable controller;

moving the weighed second feed from the weighing hopper through the feed delivery conduit by the second feed moving means;

moving the valve member of one drop box of a second group of the drop boxes to its opened position while the valve members of the other drop boxes remain in their closed positions whereby the weighed second feed is allowed to drop from the conduit into the drop box after which the second feed falls through a drop tube to a feeder therebelow within a livestock pen; and programming the programmable controller to deliver the first and second feeds to the first and second portions of the feeders respectively by the above steps according to a predetermined schedule.

14. The method of claim 13 wherein the predetermined schedule includes delivery of feed when the level of feed within a feeder drops below a pre-set level as detected by a feed lever sensor within each feeder, the feed level sensor producing a low feed level signal when the feed therein drops below the pre-set level, the low feed level signal being received by the programmable controller.

15. The method of claim 13 wherein the predetermined schedule is based on time with a predetermined weight of feed being delivered to the feeders at predetermined time intervals.

* * * * *

UNITED STATES PATENT AND TRADEMARK OFFICE
CERTIFICATE OF CORRECTION

PATENT NO. : 5,782,201
DATED : July 21, 1998
INVENTOR(S) : John A. Wells

It is certified that error appears in the above-indentified patent and that said Letters Patent is hereby corrected as shown below:

Column 4, line 44, claim 1, before "storing" delete "one or more".

Column 4, line 47, claim 1, between "the" and "storage" insert --one or more--.

Column 6, line 24, claim 13, delete "portion".

Column 6, line 50, claim 13, delete "portions" and insert --groups--.

Signed and Sealed this

First Day of December, 1998

Attest:

BRUCE LEHMAN

Attesting Officer

Commissioner of Patents and Trademarks